(12) United States Patent
Umlauft et al.

(10) Patent No.: US 9,067,683 B2
(45) Date of Patent: Jun. 30, 2015

(54) SUPPORT STRUCTURE FOR USE IN AN AIR SUPPLY ARRANGEMENT AND SERVICE SUPPLY SYSTEM COMPRISING SAID TYPE OF SUPPORT STRUCTURE AND METHOD FOR CONFIGURATION

(71) Applicant: Airbus Operations GmbH, Hamburg (DE)

(72) Inventors: Sebastian Umlauft, Hamburg (DE); Ralf Koblitz, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 13 days.

(21) Appl. No.: 13/663,140

(22) Filed: Oct. 29, 2012

(65) Prior Publication Data

US 2013/0149950 A1    Jun. 13, 2013

Related U.S. Application Data

(63) Continuation of application No. PCT/EP2011/001987, filed on Apr. 19, 2011.

(60) Provisional application No. 61/328,717, filed on Apr. 28, 2010.

(30) Foreign Application Priority Data

Apr. 28, 2010 (DE) .......................... 10 2010 018 569

(51) Int. Cl.
*B64D 13/08* (2006.01)
*B64D 13/00* (2006.01)
(Continued)

(52) U.S. Cl.
CPC ........... *B64D 13/08* (2013.01); *Y10T 29/49826* (2015.01); *B64D 13/00* (2013.01);
(Continued)

(58) Field of Classification Search
CPC .......... B23P 19/04; B64D 13/08; Y02T 50/44
USPC ........................................................... 454/76
See application file for complete search history.

(56) References Cited

U.S. PATENT DOCUMENTS 2,462,989 A * 3/1949 Mufich et al. ................. 454/286
3,330,506 A * 7/1967 Robillard et al. .......... 244/118.5
(Continued)

FOREIGN PATENT DOCUMENTS

| DE | 102006061455 A1 | * 6/2008 |
| WO | 2010122017 | 10/2010 |
| WO | 2011051148 | 5/2011 |

*Primary Examiner* — Gregory Huson
*Assistant Examiner* — Martha Becton
(74) *Attorney, Agent, or Firm* — Greer, Burns & Crain Ltd.

(57) ABSTRACT

A support structure for an air supply arrangement for air conditioning aircraft passenger cabins. The air supply arrangement comprises an centrally controlled cabin ventilation system and an individually adjustable cabin ventilation system. The support structure includes: a first section for receiving and/or integrating cabin ventilation system components, a second section for receiving and/or integrating passenger emergency oxygen supply components and a third section comprising a plurality of receiving devices. Each receiving device receives and releasably secures an active module for individually adjustable cabin ventilation. The third section has at least the number of receiving devices required for at least one receiving device to be associated with each seating row for a maximum number of seating rows arrangeable in the cabin A supply system includes at least one such support structure and one of the active modules. A method is provided for configuring a corresponding supply system.

13 Claims, 6 Drawing Sheets

(51) Int. Cl.
*B23P 19/04* (2006.01)
*B64D 13/06* (2006.01)

(52) U.S. Cl.
CPC ... *B64D2013/003* (2013.01); *B64D 2013/0625* (2013.01); *Y02T 50/44* (2013.01); *B23P 19/04* (2013.01)

(56) References Cited

U.S. PATENT DOCUMENTS

| | | | |
|---|---|---|---|
| 3,370,813 A * | 2/1968 | Albertine et al. | 244/118.5 |
| 4,783,110 A * | 11/1988 | Beukema et al. | 296/37.7 |
| 5,556,332 A * | 9/1996 | Schumacher | 454/76 |
| 5,567,230 A * | 10/1996 | Sinclair | 95/273 |
| 5,688,022 A * | 11/1997 | Adams et al. | 296/214 |
| 6,015,222 A * | 1/2000 | Schindler | 362/490 |
| 6,176,536 B1 * | 1/2001 | Miller et al. | 296/37.7 |
| 6,267,428 B1 * | 7/2001 | Baldas et al. | 296/37.7 |
| 6,273,499 B1 * | 8/2001 | Guyon | 296/214 |
| 6,318,797 B1 * | 11/2001 | Bohm et al. | 296/210 |
| 6,338,517 B1 * | 1/2002 | Canni et al. | 296/37.8 |
| 6,393,343 B1 * | 5/2002 | Frey et al. | 701/3 |
| 6,401,473 B1 * | 6/2002 | Ng et al. | 62/239 |
| 6,454,209 B1 * | 9/2002 | Bock et al. | 244/118.5 |
| 6,619,716 B1 * | 9/2003 | Sturt | 296/37.8 |
| 6,929,218 B1 * | 8/2005 | Sanford et al. | 244/118.5 |
| 6,957,839 B1 * | 10/2005 | Tiesler et al. | 296/24.34 |
| 7,037,187 B2 * | 5/2006 | Butera et al. | 454/76 |
| 7,052,068 B2 * | 5/2006 | Sturt et al. | 296/37.7 |
| 7,137,594 B2 * | 11/2006 | Mitchell et al. | 244/118.6 |
| 7,137,659 B2 * | 11/2006 | Tiesler et al. | 296/37.8 |
| 7,159,920 B2 * | 1/2007 | Byma et al. | 296/37.8 |
| RE40,617 E * | 1/2009 | Canni et al. | 296/37.8 |
| 7,487,938 B2 * | 2/2009 | Brady et al. | 244/118.5 |
| 8,401,742 B2 * | 3/2013 | Schliwa et al. | 701/49 |
| 8,430,358 B2 * | 4/2013 | Schneider et al. | 244/118.5 |
| 8,454,415 B2 * | 6/2013 | Nitsche et al. | 454/76 |
| 2006/0091257 A1 * | 5/2006 | Melberg et al. | 244/118.5 |
| 2008/0078871 A1 * | 4/2008 | Munson et al. | 244/118.5 |
| 2009/0084896 A1 * | 4/2009 | Boucher et al. | 244/118.5 |
| 2009/0275277 A1 * | 11/2009 | Al-Alusi et al. | 454/76 |
| 2010/0012780 A1 * | 1/2010 | Kohlmeier-Beckmann et al. | 244/118.5 |
| 2010/0043794 A1 * | 2/2010 | Saito et al. | 128/204.22 |
| 2010/0081369 A1 * | 4/2010 | Space et al. | 454/76 |
| 2010/0093267 A1 * | 4/2010 | Hogh et al. | 454/76 |
| 2010/0096919 A1 * | 4/2010 | Meckes et al. | 307/9.1 |
| 2010/0224727 A1 * | 9/2010 | Bauer et al. | 244/118.5 |
| 2011/0147520 A1 * | 6/2011 | Schneider | 244/118.5 |
| 2011/0212678 A1 * | 9/2011 | Brunnberg et al. | 454/76 |
| 2011/0240796 A1 * | 10/2011 | Schneider | 244/118.5 |
| 2012/0012707 A1 * | 1/2012 | Schliwa et al. | 244/118.5 |
| 2012/0074258 A1 * | 3/2012 | Papke et al. | 244/118.5 |
| 2012/0228426 A1 * | 9/2012 | Schneider et al. | 244/118.5 |
| 2012/0234974 A1 * | 9/2012 | Sieben | 244/118.5 |
| 2012/0325217 A1 * | 12/2012 | Lang et al. | 128/205.25 |
| 2013/0005231 A1 * | 1/2013 | Schneider et al. | 454/76 |

* cited by examiner

SUPPORT STRUCTURE FOR USE IN AIR SUPPLY ARRANGEMENT AND SERVICE SUPPLY SYSTEM COMPRISING SAID TYPE OF SUPPORT STRUCTURE AND METHOD FOR CONFIGURATION

CROSS-REFERENCES TO RELATED APPLICATIONS

This patent is a Continuation application of PCT Application Serial No. PCT/EP2011/001987, which was filed on Apr. 19, 2011, which claims priority to U.S. Provisional application Ser. No. 61/328,717 filed on Apr. 28, 2010 and German patent application Ser. No. DE 10 2010 018 569.8 filed on Apr. 28, 2010, the contents of all of the above being incorporated herein by reference.

BACKGROUND OF THE INVENTION

The present invention relates to a support structure for use in an air supply arrangement for air conditioning passenger cabins in aircraft, wherein the air supply arrangement comprises at least one centrally controlled cabin ventilation system and an individually adjustable cabin ventilation system.

The cabin ventilation system which is controlled centrally, for example by way of the cockpit, serves primarily for the continuous supply of fresh air necessary in an aircraft cabin owing to the high passenger density. In practice, corresponding air outlet openings of the centrally controlled cabin ventilation system are arranged in the region of the overhead stowage bins mounted above the seating rows or in the foot space of the aircraft passenger cabin.

In addition, commercial aircraft generally have an additional, individually adjustable cabin ventilation system for each individual seat within the passenger cabin, which is connected to adjustable air nozzles, so-called "air showers". These air showers are mounted above the passenger seats and can be individually adjusted by each passenger in terms of the air flow and the flow direction. To enable each passenger to comfortably reach the air shower associated with his seat, this has to be arranged in a predetermined position relative to his seat.

This demonstrates that the arrangement of the air showers in the longitudinal direction of the passenger cabin has to implemented individually for each layout of a passenger cabin in relation to the seat position. Since the air showers of the individually adjustable cabin ventilation system have to be placed precisely at a defined point above the respective seats or seating rows of the passenger cabin, the ducting for the aircraft air conditioning system also considerably complicates installation in the cabin configuration. In addition to the precise position, it is also necessary to check and adjust clearances with respect to the interior trim of the passenger cabin. This results in generally time-consuming and expensive definition, administration and installation processes.

In the operation of modern commercial aircraft, it is becoming increasingly important to operate the aircraft at optimum capacity wherever possible. However, optimising the capacity of the aircraft is often only possible if the aircraft passenger cabin can be flexibly converted, at least to a certain extent, i.e. the spacings between the seating rows arranged behind one another in the aircraft passenger cabins can be adapted as flexibly as possible (reconfiguration).

Therefore, from the point of view of an airline, it can make economic sense during certain times of increased air traffic, e.g. during the holiday period, to operate a commercial aircraft with a greater number of seats or seating rows arranged at a smaller spacing from one another in the longitudinal direction of the cabin. In other instances, it can make more sense to fit the passenger cabin with fewer seats or seating rows arranged at a greater spacing from one another in the longitudinal direction of the aircraft cabin. If required, not only is the spacing between the seating rows altered in such a reconfiguration, but different types of seats are also provided and further operating and comfort elements for the flight passengers are provided or not provided depending on the class (economy, business or first class).

In any case, the individually adjustable cabin ventilation system likewise has to be adapted to the altered cabin layout so that the air showers associated with the seats are also arranged in the correct position relative to the seats when there is a change in the spacings between the seats or seating rows arranged in the longitudinal direction of the aircraft cabin. This type of reconfiguration is virtually as involved as a replacement configuration of the passenger cabin. In particular, safety-relevant layout modifications have to undergo complex tests before the aircraft is recommissioned following the cabin reconfiguration. Finally, depending on the extent of the reconfiguration measures undertaken, an official, or at least a manufacturer's, certification of the modified passenger cabin configuration is required. Converting a passenger cabin configuration of a commercial aircraft which is determined by the manufacturer is therefore very time-consuming and expensive.

DE 10 2007 019 539 A1 discloses an air supply device for air conditioning passenger spaces in aircraft, in which components of the centrally controlled cabin ventilation system and the individually adjustable cabin ventilation system are connected to form an independently operable assembly. As a result, a compact air supply device is provided which is essentially easier to assemble than two separate air supply systems. However, it is also necessary to ensure with these independently operable assemblies that they are arranged in a precise position relative to the corresponding seating rows. Furthermore, the problems relating to the considerable expenditure of time and money also arise in the event of a desired reconfiguration since the components of the individually adjustable cabin ventilation system are not suited to adaptation in terms of their position.

Solutions are furthermore known from the prior art which essentially enable the air showers to be adapted in the event of a reconfiguration of the seating layout. Therefore, DE 10 2007 014 406 B3 discloses a supply channel with an air distributing system which has an elongated housing with a hollow profile extending in the longitudinal direction of the housing and air shower rails. A lateral surface of the hollow profile has a plurality of perforation openings against which the air shower rails lie tightly with their air inlet so that air can flow from the supply channel into the air shower rails through the perforation openings. Those perforation openings which do not lead into an air inlet of an air shower rail can be sealed by applying an adhesive film.

However, applying this type of adhesive film is arduous and both time and cost intensive. It is furthermore necessary to remove the attached adhesive film portions for each reconfiguration of the passenger space and, after the air shower rails have been repositioned, to adapt new adhesive films of a suitable length to the altered spacings between the air shower rails and apply them to the perforation openings of the hollow profile.

Document DE 43 03 681 C1 discloses an air conduit and an air shower which is connected to said air conduit and can be displaced along it relative thereto. The air conduit here consists of a linear dimensionally stable hollow profile with a longitudinal slot, wherein the longitudinal slot is sealed by at least one sealing lip which is closed in the rest position as a result of pre-tension. To extract the air, a carriage which is guided in the longitudinal direction of the air conduit is provided with an extraction nozzle which projects into the interior of the hollow profile and is connected to the air shower. The carriage has an outer guide and an inner guide which are fixedly connected to the extraction nozzle and are thus arranged at a mutual spacing such that they form a clearance which is adapted to the sealing lips. However, the integration into the trim of the interior passenger space has proven difficult in such an embodiment.

The problem moreover arises in both known arrangements that the precise position of the air showers relative to the respective seat positions has to be established before these can be adapted, which complicates installation considerably.

SUMMARY OF THE INVENTION

An object of the present invention therefore consists in providing a simple, economical and flexible air supply for air conditioning passenger cabins in aircraft.

This object is achieved by a support structure for use in an air supply arrangement having the features of claim 1 and a supply system having the features of claim 6 and a method for configuring a corresponding supply system having the features of claim 10.

The support structure according to the invention comprises a first section for receiving and/or integrating components of the centrally controlled air supply system, a second section for receiving and/or integrating components of an emergency oxygen supply for the passengers and a third section comprising a plurality of receiving devices, wherein each receiving device is designed to receive and releasably secure an active module for individually adjustable cabin ventilation. The third section here comprises at least the number of receiving devices required for at least one receiving device to be associated with each seating row for maximum occupancy of the passenger cabin with a maximum number of seating rows arranged at a predetermined minimum spacing.

The term "support structure" refers here to a structure with the above-mentioned three sections which extends in the longitudinal direction of the aircraft, wherein it goes without saying that, as such, this can be composed of a plurality of mutually connectable components. It is thus possible, for example, for a plurality of individual support structure parts to be positioned together in the longitudinal direction and conjunctively form the support structure according to the invention.

A first section of the support structure serves to receive and/or integrate components of the centrally controlled cabin ventilation system, i.e. the first section may itself form components of the centrally controlled cabin ventilation system and/or at least receive these internally. The components of the centrally controlled cabin ventilation system are connected to the aircraft air conditioning system responsible for the air conditioning, i.e. the air temperature and humidity of the air to be distributed.

In aircraft, the emergency oxygen supply for the passengers represents a system which is separate from the air supply arrangement for the air conditioning. This has to be kept ready in case the central pressure of the cabin and/or the fresh air supply into the cabin fails. Thus, in wide-bodied aircraft, oxygen supply units are provided for example as cuboidal containers. These are usually integrated above the passenger seats and comprise for example oxygen masks and an oxygen supply means to which the oxygen masks are connected.

In practice, it is often the integration of the emergency oxygen supply for the passengers which poses a problem, since only a small installation space is available for this. In the present invention, this is provided in the region of the second section of the support structure. If it has a sufficiently large installation space, the second section can of course also receive and/or integrate other components, for example components of a speaker system, a light supply or information supply for the passengers and the like as well as power and data conduits necessary for this.

The third section finally comprises a plurality of receiving devices which are arranged for example adjacent to one another in the longitudinal direction of the passenger cabin. Each receiving device here is designed to receive and releasably secure an active module for individually adjustable cabin ventilation. An active module for individually adjustable cabin ventilation here may comprise a plurality of air showers, wherein the number of air showers corresponds to the number of seats of the associated seating rows which are to be supplied.

The third section of the support structure here is designed for maximum occupancy of the passenger cabin, where the seating rows are arranged at a predetermined minimum spacing from one another so that a maximum number of seating rows can be arranged within the passenger cabin. The predetermined minimum spacing can be based for example on legal or official stipulations which specify how large the minimum spacing between the seating rows in the aircraft has to be. This ensures that a configuration of the passenger cabin enables the commercial aircraft to have the maximum occupancy of passengers, with an occupancy with fewer seating rows of course also being possible in the event of a reconfiguration of the cabin layout.

Releasably securing an active module in a receiving device ensures here that it can also be removed from the respective receiving device again in the event of a reconfiguration. The term "active module" merely refers here to the fact that such a module is part of the individually adjustable cabin ventilation system.

It can furthermore be provided for the first section to comprise an air conduit and an outlet for the cabin ventilation system, which are designed to be integrated in the support structure.

In this embodiment, a separate air conduit is not received in the first section of the support structure, rather this latter forms an air conduit itself. Likewise, the first section comprises an integrated outlet for the cabin ventilation system. This is particularly advantageous since it is not necessary to provide and assemble separate parts such as a separate air conduit and the like, thus enabling a reduction in costs, assembly times and the weight of the arrangement.

It is thus possible, for example, to construct the air conduit as a hollow profile which extends in the longitudinal direction of the passenger cabin. The hollow profile may be provided directly with an outlet for the cabin ventilation system, for example a perforation or a slot provided on the lateral surface of the hollow profile, or it may be fluidically connected to such by a connecting section.

The third section may furthermore comprise a supply conduit which is connected by at least one connecting opening to each of the plurality of receiving devices of the third section, wherein in particular each receiving device of the third section is of a cylindrical construction and is delimited by a generated cylinder surface and an end face, and wherein in particular the at least one connecting opening is constructed at the end face of the cylindrical receiving device.

The supply conduit of the third section of the support structure may likewise be constructed as a hollow profile here, which extends in the longitudinal direction of the passenger cabin and serves as an air conduit. The receiving devices of the third section are preferably connected by at least one connecting opening to the supply conduit so that air from the supply conduit can flow into the receiving devices through the connecting opening. Alternatively, the supply conduit may, of course, also serve to receive a separate air conduit, although this would call for additional connection points constructed on the separate air conduit in the region of the connecting openings.

Each receiving device is preferably of a cylindrical construction and is delimited by a generated cylinder surface and an end face. However, it is not compulsory for either the supply conduit or the cylindrical receiving device to have a circular cross-section.

If anything, in terms of purely manufacturing considerations, it is instead advantageous if the cross-sections are of a polygonal design. This enables a lateral surface of the supply conduit to simultaneously form the delimiting end faces of the individual receiving devices which adjoin it.

The generated cylinder surfaces of the receiving device may furthermore likewise comprise one or more recesses, thus enabling a reduction in material and weight.

The cylindrical shape of the receiving devices enables the active modules to be pushed into, and pulled out of, the receiving devices on the side which is not delimited by an end face. The friction force produced here at the contact surfaces of an inserted active module and the respective receiving device can already be sufficient to releasably secure the active module in the receiving means. To this end, a special friction-increasing surface can be provided for example in a contact region of the active module and the receiving device.

However, it is additionally or alternatively also possible to provide releasable securing devices such as, for example, corresponding latching hooks and recesses, snap and click mechanisms and the like, and also magnetic securing devices which are arranged both on the receiving device and also on the corresponding active module and can form a releasable connection with one another.

The supply conduit of the third section may furthermore comprise an air conduit and at least one power and/or data conduit.

As already described above, it is possible in the most simple case for the supply conduit to have only one air conduit, either in that it is itself constructed as an air-conducting hollow profile or in that a separate air conduit is received therein. However, it is also additionally possible to receive further conduits, for example power and/or data conduits, in the supply conduit. These may be constructed as insulated cables with corresponding connection points or, for example, as non-insulated conductors to which a current collector may be connected by conductive contact (sliding contact, spring contact or the like). Finally, it is however also possible for contactless power and data transmission to take place, for example by induction or resonance frequency.

It is furthermore possible for at least one sensor to be associated with each receiving device, said sensor being designed to determine whether the receiving device is equipped with an active module.

A sensor of this type may be designed for example as a pressure-sensitive sensor which is arranged in the receiving device and may be activated by an active module within the receiving device. However, other sensor types which serve to determine whether an active module is inserted in the receiving device are likewise conceivable.

A supply system according to the invention for supplying passengers in a passenger space comprises at least one support structure having the above-mentioned features and at least one active module for individually adjustable cabin ventilation.

In a further development, the supply system may comprise at least one further, passive module wherein the passive module is designed to be received in at least one of the receiving devices of the third section of the support structure in which no active module is received.

As described above, the third section of the support structure comprises at least the number of receiving devices required for a maximum number of seating rows with maximum occupancy of the passenger cabin, wherein at least one receiving device is associated with each seating row. However, if the seating rows are arranged at relatively large spacings from one another in an initial configuration or a reconfiguration of the passenger cabins, it is no longer necessary to provide an active module in each receiving device; therefore some of the receiving devices remain free. So-called passive modules may be inserted into these. In this connection, the term "passive module" merely indicates that the inserted module is not part of the individually adjustable cabin ventilation system.

It may furthermore be provided for the active module to have at least one connection piece corresponding to the connecting opening of the third section and at least one air nozzle connected thereto, wherein the active module comprises in particular at least one air quantity control device which is associated with the at least one air nozzle and wherein in particular the air quantity control device is electrically controllable.

The connection piece may be either inserted into the connecting opening of the third section or is dimensioned such that it can be placed on a collar or the like, which delimits the connecting opening. It is essential here that air which can flow from the supply conduit into the receiving device through the connecting opening is introduced into the active module through the connection piece. This module in turn comprises at least one air nozzle which is connected to the connection piece, wherein in practice the number of air nozzles provided is sufficient for each passenger seat of a seating row associated with the active module to be provided with an air nozzle.

The air nozzles may be used to adjust the air direction and the expulsion characteristics of the emitted air, i.e. the shape of the blown-out air stream, which can be dispersed or focussed.

Furthermore, the passenger can generally control the quantity of the emitted air by is actuating the air shower. In the present embodiment, this is implemented by an electrically controllable air quantity control device which is associated with the respective air nozzle. Air quantity control device of this type may be formed for example by an electrically controllable motor with or without rotors for air quantity control or the like. Air quantity control devices of this type are essentially known from the prior art and are therefore not discussed in more detail at this point.

The electrical controllability of the air quantity control devices requires an electrical supply to the air quantity control devices, which can likewise be provided by the active module. This may have a current collector or plug in the region of its connection piece or on a separate contact surface, which enables it to be connected to a power conduit of the supply conduit and to collect current from this. Alternatively, it is essentially also possible to provide a mechanically controllable air quantity control device.

The passive module may have a connecting section corresponding to the connecting opening, wherein the passive module in particular may comprise operating or comfort elements which may be connected by the connecting opening to a data and/or power conduit of the connecting conduit.

It is essentially particularly advantageous that, in the connecting region, the passive module is constructed similarly to the active module so that it can be inserted in the same manner into the connecting opening or placed on a collar or the like surrounding this connecting opening.

It applies to both the active and the passive module that the element inserted into the receiving device may be releasably secured for example by the connection between the connection piece or connecting section and the connecting opening. The friction force produced in a contact region between the connection piece or connecting section and the connecting opening is possibly already sufficient for this. The friction force which is produced at the contact surfaces of the connection piece or connecting section and the inner circumferential surface of the connecting opening or the collar can be additionally increased by providing a friction surface or a coating of a material with a higher coefficient of friction. However, it is also alternatively possible to provide additional securing devices, as already mentioned above.

Contrary to the active module, the passive module does not form part of the individually adjustable cabin ventilation system. The passive module therefore also has no air nozzles or the like through which air which possibly flows into the passive module through a corresponding opening into the connecting section can be delivered to the passenger cabin.

In the most simple case, the passive module is constructed in such a way that the connecting section simply closes the connecting opening in the manner of a plug, as it were, so that air can no longer flow from the connecting conduit into the corresponding receiving device.

However, if required, it can also be useful to introduce air though the connecting opening into the passive module in order to thus implement the function of a cooling element.

The passive module can moreover comprise operating or comfort elements, such as reading lights, information displays, flight attendant call buttons, speakers for an entertainment system and the like. Such operating and comfort elements may moreover be supplied with power and/or data by way of the passive module in that the passive module provides a connection with a data and/or power conduit of the connecting conduit by way of the connecting opening. It is possible here for ports, for example in the form of receiving devices for plug connectors or the like, to be provided on the data and/or power conduits in the region of the connecting openings. However, it is also alternatively possible to form other connections, for example by means of sliding or spring contact or the like, between a data and/or power conduit and the operating or monitoring elements of the passive module.

The passive module may moreover be in electrical contact with at least one active module.

This means that, in the case of an electrically controllable air quantity control device, the active module itself does not have to form an electrical connection with the supply conduit but rather this can be implemented by way of an adjacent passive module.

All in all, the use of additional passive modules is particularly advantageous, since the available installation space in the form of the free receiving device of the third section of the support structure can be reliably covered from the outside, i.e. from the passenger cabin side, with the aid of the received passive module and it can be optionally used at the same time to implement further functions.

The method according to the invention for configuring a supply system having the above-mentioned features in a passenger cabin of an aircraft comprises the steps: determining an equipment of the support structure with reference to a predetermined occupancy of the passenger cabin with a number of seating rows arranged at a predetermined spacing, wherein at least one active module is associated with each seating row; and inserting active modules according to the determined equipment of the support structure.

For example, with a maximum occupancy of the passenger cabin with a maximum number of seating rows arranged at a predetermined minimum spacing, wherein at least one receiving device is associated with each seating row, an active module is inserted and releasably secured in each receiving device of the support structure which is provided for this.

The method may furthermore comprise the following step, for example within the framework of a reconfiguration of the cabin layout: inserting passive modules into the receiving devices of the third section of the support structure in which no active module is received.

If an occupancy of the passenger cabin with seating rows is therefore specified which provides fewer seating rows than is the case for maximum occupancy, the spacings between the individual seating rows are generally greater than they are for maximum occupancy of the passenger cabin. Therefore, the spacings between the active modules which are respectively associated with the seating rows are also greater, which means that individual receiving devices of the support structure are possibly no longer occupied by an active module. Passive modules, which can have the features mentioned above, can then be inserted into these receiving devices.

It is furthermore additionally possible when determining an equipment of the support structure to assign each seating row a predetermined number of components for an emergency oxygen supply for the passengers. These can then likewise be inserted into the support structure, namely into the second section of the support structure, during the configuration or reconfiguration.

The method may furthermore comprise the step: determining an equipment for each receiving device of the third section with the aid of sensors, wherein these determine whether a receiving device is equipped with an active module.

In this embodiment, it is therefore not only possible to determine with the aid of sensors whether a receiving device is equipped with a module or is free, but also whether the inserted module is an active module or a passive module. It is in turn possible for example to use pressure sensors for this, wherein a recess or a projection optionally serve for differentiating between an active module and a passive module so that a pressure sensor is for example activated by only one type of module.

It may furthermore be useful to provide different types of passive modules, for example those which have an operating or comfort element (passive module with additional function) and those which serve merely for covering and sealing purposes. In such a case, it is particularly favourable to provide a plurality of sensors, namely at least one for an active and one for a passive module with additional function. Alternative design options with other sensor types are of course likewise conceivable.

For fitting the second section with components of the emergency oxygen supply, it is also similarly possible to provide sensors which can be used to determine whether the specified components are inserted in a predetermined region of the second section or not.

Finally, the method may further comprise the steps: comparing the determined equipment of the support structure with a predetermined equipment; and transmitting feedback relating to whether the determined equipment of the support structure corresponds to or deviates from the determined equipment.

The "determined equipment of the support structure" here can in turn refer to both the equipment with active and or passive modules and with components for an emergency oxygen supply for the passengers. However, the "determined equipment of the support structure" can also be restricted to the equipment of the third section with active modules. As described above, it is also optionally possible to use different types of passive modules and to likewise account for these as different modules when determining the equipment of the support structure.

The feedback may be transmitted in various ways, for example by way of an acoustic signal or an optical display unit. For example, it is thus conceivable to visibly arrange a small light or the like for an operator on each of the insertable modules, be it an active or a passive module, during the configuration. If there is a deviation between the determined equipment and the predetermined equipment, this can light up and indicate to the operator that the inserted module is placed in the wrong position. It goes without saying that it can also be provided for the small light to light up in the reverse situation, i.e. only when the determined equipment corresponds to the predetermined equipment. It is likewise alternatively or additionally possible for a display unit in the cockpit to indicate to the personnel whether the passenger cabin has been equipped according to the predetermined layout.

For the feedback transmission, it is similarly possible to use designated power and/or data conduits which are provided in the supply conduit and connected to a central data transmission unit, for example for electrically controlling an air quantity control means, for additional operating or comfort elements and the like. It is particularly advantageous here if not only the active and passive modules are taken into account when determining the equipment of the support structure, but also the number and position of components for the emergency oxygen supply for the passengers, as these are relevant safety factors.

An equipment of the support structure with reference to a predetermined occupancy of the passenger cabin may be determined for example on the basis of data in a database which includes both characteristic data of the modules and components which can be assembled and also regulations for the configuration. Based on the desired occupancy of the passenger cabin, it is possible to specify the spacings between the seating rows and, according to this, which receiving devices of the support structure are to be equipped with active modules and, in the event that the passive modules are provided with different operating or monitoring elements, the respective equipment of the remaining receiving devices with the corresponding passive modules. Depending on the occupancy of the passenger cabin, it is similarly also necessary to adapt the emergency oxygen supply for the passengers, which can likewise be determined with the aid of sensors.

BRIEF DESCRIPTION OF THE DRAWINGS

A preferred embodiment of the invention is now explained in more detail with the aid is of the attached, schematic figures which show.

DETAILED DESCRIPTION OF THE PREFERRED EMBODIMENTS

Figure 1:
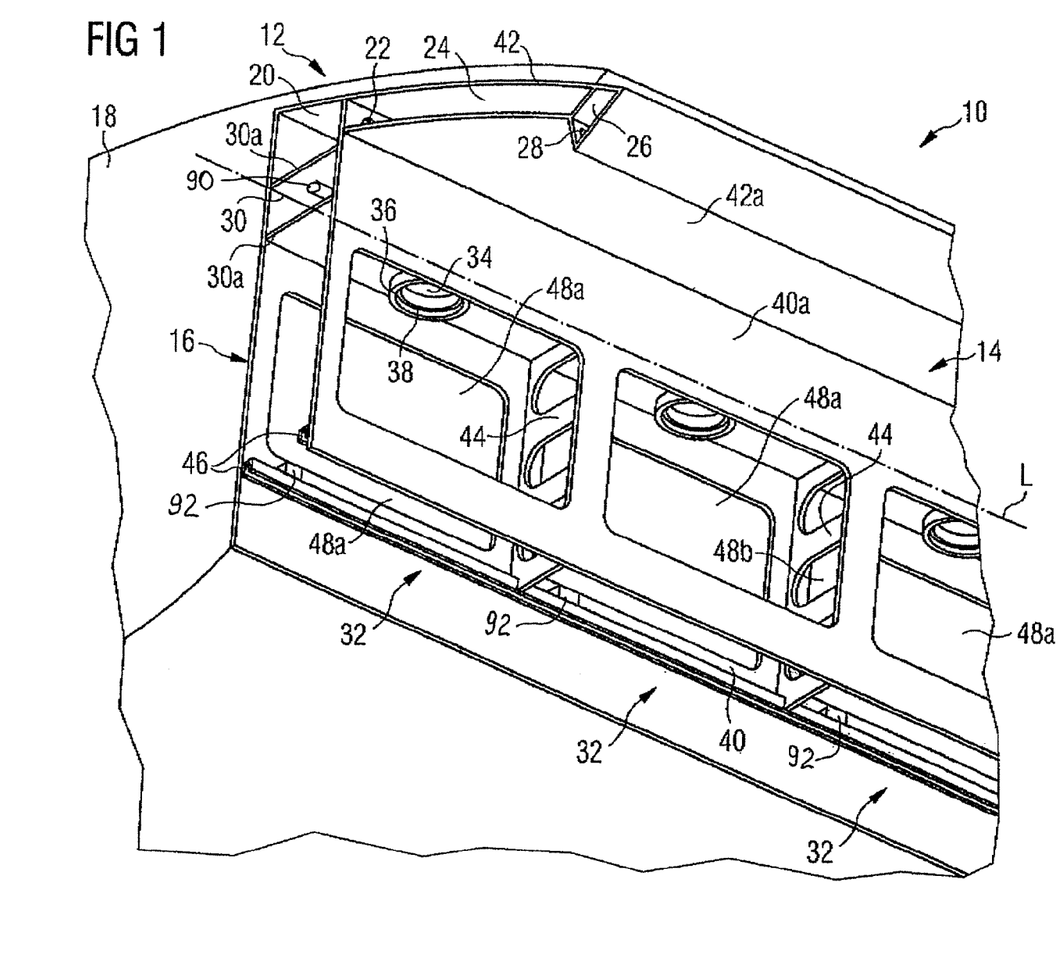
FIG. 1 an isometric partial view of an inventive support structure of an air supply arrangement.

FIG. 1 shows a support structure according to the invention in a partially sectional, isometric illustration, which is denoted by the reference numeral 10. The support structure 10 for use in an air supply arrangement for air conditioning passenger cabins in aircraft has substantially three sections, namely a first section 12, a second section 14 and a third section 16.

The first section 12 and the third section 16 are arranged relative to one another substantially in the manner of two sides of a triangle which bridge a space between them. This describes the second section 14 which provides a necessary installation space for receiving and/or integrating components of an emergency oxygen supply for the passengers within the passenger cabin. Such components of an emergency supply may be for example oxygen supply units having a particular number of oxygen masks each arranged behind a flap or the like which is designed to open automatically in an emergency. The opening of such a flap may be activated by a power surge or by a data signal.

The first section 12 serves to receive and/or integrate components of the centrally controlled cabin ventilation system. In the embodiment illustrated in FIG. 1, the corresponding components are integrally constructed in the support structure 10, thus advantageously reducing the number of parts. The first section 12 here comprises an air conduit constructed as a hollow profile 20, a connecting region 24 and an outlet section 26, wherein the connecting region 24 connects the air conduit 20 and the outlet section 26.

The support structure 10 extends along a longitudinal axis L which, in the installed state of the support structure 10, is substantially parallel to the longitudinal axis of a passenger cabin of an aircraft. The support structure 10 here is mounted on the rear side faces of the overhead stowage bins 18 provided in the aircraft cabin and an adjoining inner surface of the passenger space (c.f. also FIG. 5).

The air conduit 20 and the outlet section 26 are both formed by a hollow profile which extends parallel to the longitudinal axis of the passenger cabin. Accordingly, the connecting region 24 also extends along the longitudinal axis of the passenger cabin. At their lateral surfaces adjoining the connecting region 24, the hollow profiles of the air conduit 20 and the outlet section 26 each have through openings 22 and 26a through which air which is supplied into the air conduit 20 by a centrally controlled aircraft air conditioning system can flow into the outlet section 26. This furthermore has outlet openings 28 at a second lateral surface which enable the supplied air to flow out into the interior cabin region.

The third section 18 essentially serves for the individually adjustable cabin ventilation of a passenger cabin. To this end, it has a supply conduit 30 which extends substantially parallel to the longitudinal axis of the passenger cabin and therefore also parallel to the air conduit 20, and a plurality of receiving devices 32 which are connected by connecting openings 34 to the supply conduit 30. Separate active modules 50 for individually adjustable cabin ventilation can be inserted into the receiving devices 32.

The illustrated support structure 10 is composed of few individual parts which, in their assembled condition, can serve for directed air conduction and for receiving components. The support structure 10 here comprises two substantially planar plates 40 and 40a, referred to below as first contact plate 40 and first inner plate 40a, two gently curved plates, referred to below as second contact plate 42 and second inner plate 42a, and several spacer plates, referred to below as first spacer plates 30a and second spacer plates 44, and a longitudinally extending hollow profile. The parts can be connected to one another for example by welding, soldering or adhesion or in some other manner and thus form the support structure 10.

The two planar plates 40, 40a are arranged at a defined spacing parallel to one another, wherein the first and second spacer plates 30a, 44 are arranged between them such that they are substantially parallel thereto. The respective first spacer plates and the respective second spacer plates here are likewise aligned parallel to one another. The first spacer plates 30a thus delimit the supply conduit 30 of the third section 16 together with the two substantially flat plates 40, 40a, whilst the second spacer plates form the cylindrical receiving device 32 together with a first spacer plate 30a and the substantially planar plates 40, 40a.

The substantially curved plates 42 and 42a have a similar radius of curvature. Together with the hollow profile 26, they form the connecting region 24 and the outlet section 26 of the first section 12. As a result of the second contact plate 42 abutting with a lateral edge against the first contact plate 40, this moreover delimits the air conduit 20 of the first section 12 with one of the first spacer plates 30a and the first inner plate 40a.

In addition to the through openings 22 and 26a described above, the outlet openings 28 and the connecting openings 34, the substantially planar plates 40 and 40a and also the second inner plates 42a have recesses 48a and b which contribute to reducing the weight of the support structure 10.

A support structure for an air supply arrangement in an aircraft is thus produced which is not only simple to manufacture but also economical and lightweight.

The connecting openings 34 in the illustrated embodiment all have a collar 36 which projects into the receiving devices 32 and has an inner shoulder 38. Starting from the free end of the collar 36, this has a first larger diameter in a first section and a second smaller diameter in a second section, with the two sections being connected to one another by the shoulder 38. The collar 36 generally serves to stabilise the connection between modules which are arranged in the receiving devices 32, and the supply conduit 30.

Figure 2:
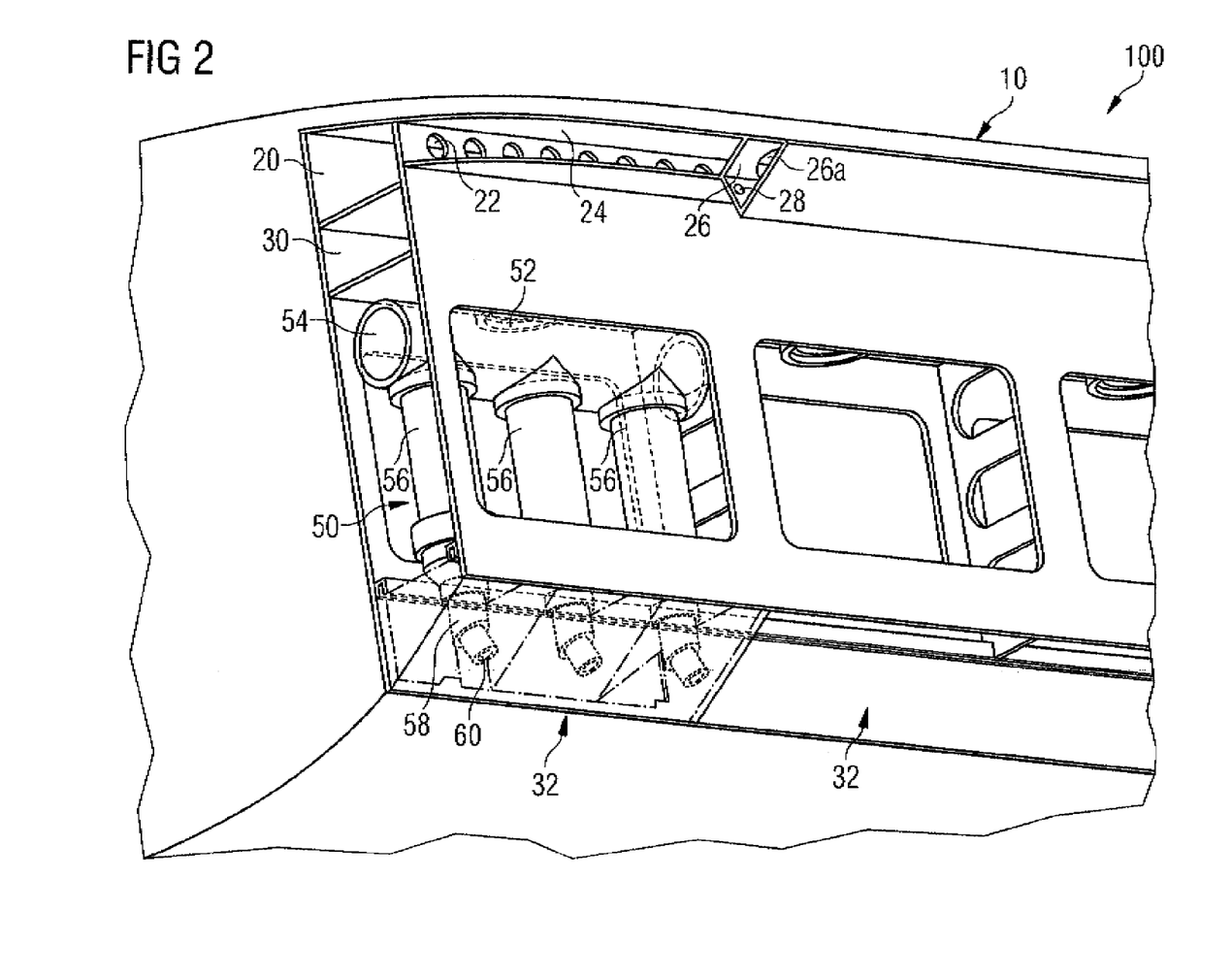
FIG. 2 an isometric partial view of an inventive supply system with a support structure according to FIG. 1.
Figure 4A:
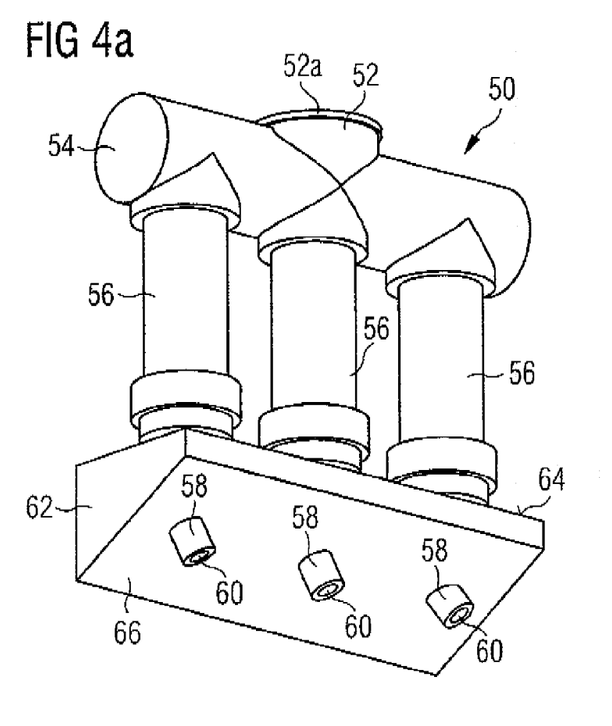
FIGS. 4a and 4b a respective active or passive module for an inventive supply system according to FIG. 3.

FIG. 2 shows an inventive supply system 100 with a support structure 10 according to FIG. 1, wherein an active module 50 is inserted in the first recess 32 (as seen from the left). As can also be seen in FIG. 4a, an active module 50 of this type has a connection piece 52 which can be inserted, at least in sections, into the connecting opening 34. To enable as air-tight a connection of the active module 50 with the supply conduit 30 as possible, the connection piece 52 has a seal 52a at its free end. This seal can be designed as a sealing face, as a separate sealing ring or the like, wherein the diameter is adapted to the internal diameter of the collar 36. The seal 52a may furthermore be designed so that it increases a friction force produced in the contact region of the connection piece 52 and the inner circumferential surface of the collar 36 so that the active module 50 is thus held in the receiving device 32.

If an active module 50 is connected by way of its connection piece 52 to the connecting opening 34, then air flows out of the supply conduit 30 into the connection piece 52 and, from there, is distributed to a plurality of air supply fittings 56 through an air distributing fitting 54. As shown in FIG. 2, an air quantity control device 56a, which can be controlled for example electronically, is provided in the interior of the air supply fitting 56. An air quantity control device 56a may be implemented for example by a corresponding motor with or without rotors or the like and serves to control the quantity of air flowing into the passenger cabin.

In order to enable individually adjustable cabin ventilation, a separate air quantity control device 56, which can be individually adjusted by the passengers, is therefore associated with each air nozzle 58. With the aid of the air nozzle 58, it is additionally possible to determine both the air direction of the air discharged through a blow opening 60, since the air nozzles can be rotated in known manner relative to the head piece 62 of the active module 50, and the expulsion characteristics of the air flowing out by altering the blow opening 60.

Figure 3:
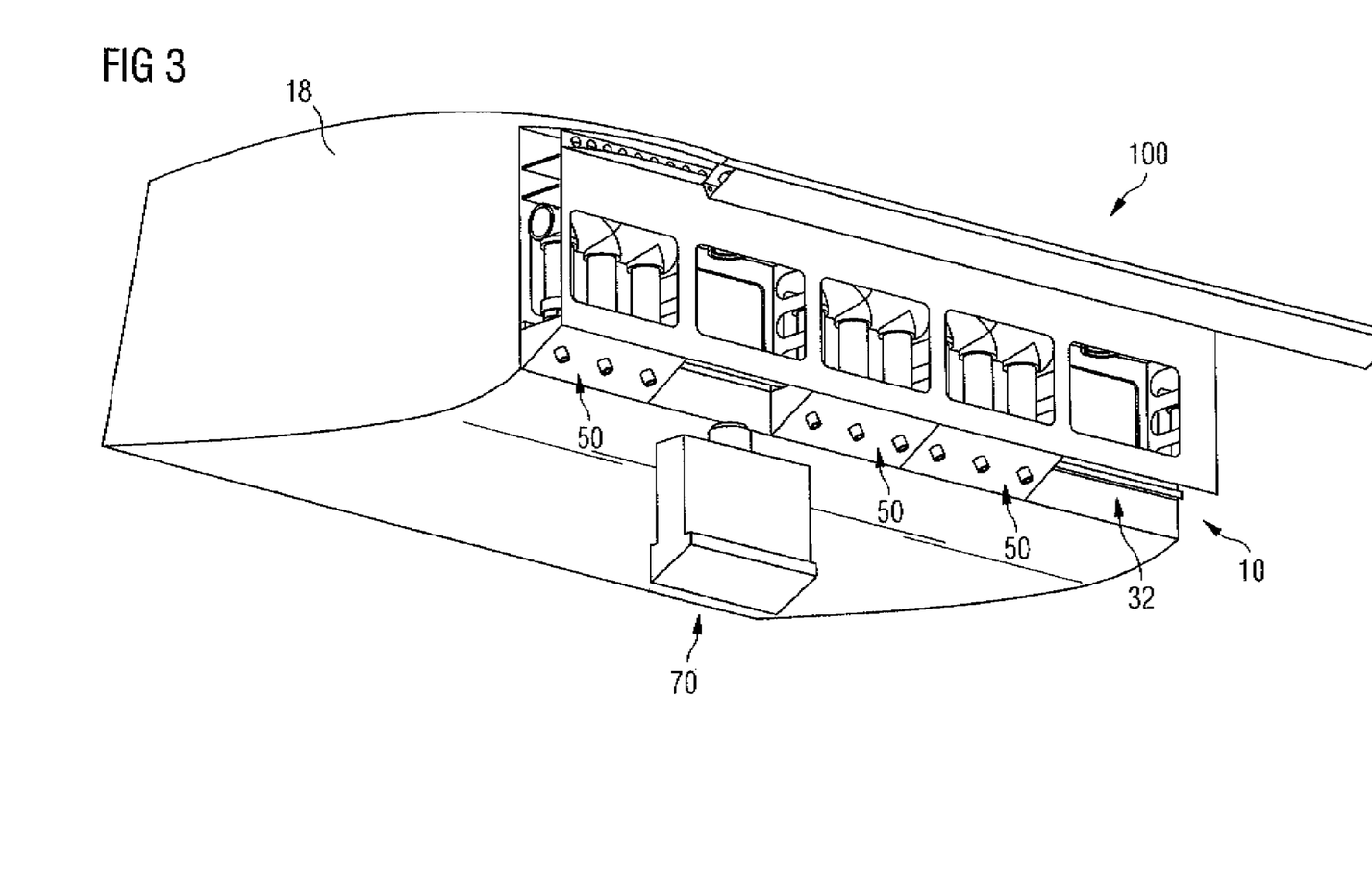
FIG. 3 an isometric view of an inventive supply system with a passive module.

FIG. 3 shows a supply system 100 having a plurality of active modules 50 and a passive module 70. As is also the case in FIGS. 1 and 2, the support structure 10 is secured with its first and second contact plate 40 and 42 against a rear side face of an overhead stowage bin 18 provided in the passenger cabin and an inner surface of the interior passenger space.

In the support structure 10, active modules 50 are inserted in the first, third and fourth receiving devices 32 (as seen from the left), whilst a passive module 70 is on the point of being inserted into the second recess 32 (as seen from the left). A passive module 70 of this type is furthermore also shown in FIG. 4b.

Figure 4B:
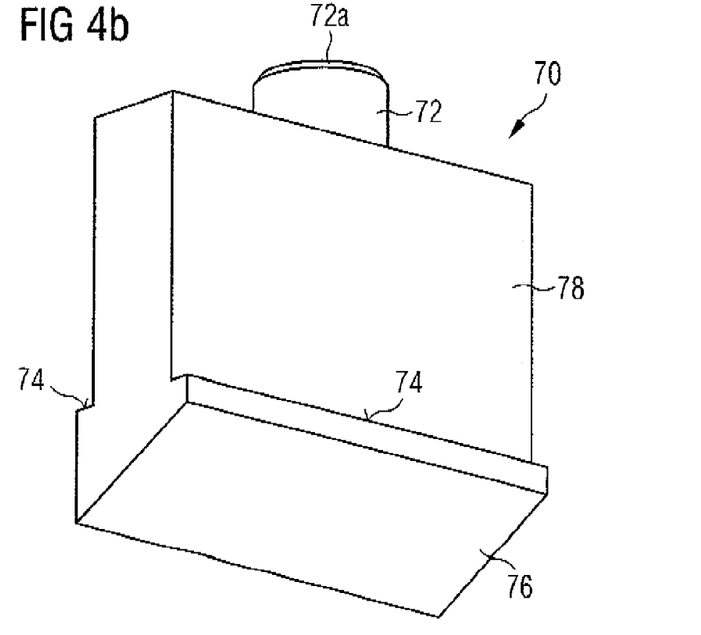

Contrary to an active module for individually adjustable cabin ventilation, a so-called passive module 70 is not a component of the individually adjustable cabin ventilation system. In terms of its external geometry, the passive module 70 corresponds to the active module 52 to the extent necessary to likewise enable the insertion of the passive module 70 into the receiving device 32 of a support structure 10 according to the invention.

Accordingly, the passive module 70 has a connecting section 72 for connection to a connecting opening 34 of the receiving device 32 whereof the external diameter corresponds to that of the connection piece 52. A sealing shoulder 72a corresponding to the shoulder 38 of the collar 36 is furthermore constructed on the connecting section 72.

The module body 78 has stop shoulders 74 and a connection face 76 at its end which is remote from the connecting section 72. The stop shoulders 74 correspond substantially to the stop face 64 of the active module 50. In the case of both an active and a passive module, the stop face 64 and stop shoulders 74 serve to position this correctly in the receiving device 32 and to secure it on the support structure 10, possibly with the aid of a separate securing mechanism.

A securing mechanism of this type can have for example two securing rails 46 which are arranged on the support structure 10 in the region of the third section 16. The modules 50, 70 can have corresponding securing elements (not illustrated) in the region of their stop face 64 or stop shoulder 74, which latch in the securing rails 46 under pressure when the module is moved into the receiving device 32 (snap and click mechanism). Alternative securing arrangements with mechanical, magnetic or other securing devices are likewise conceivable.

Figure 5:
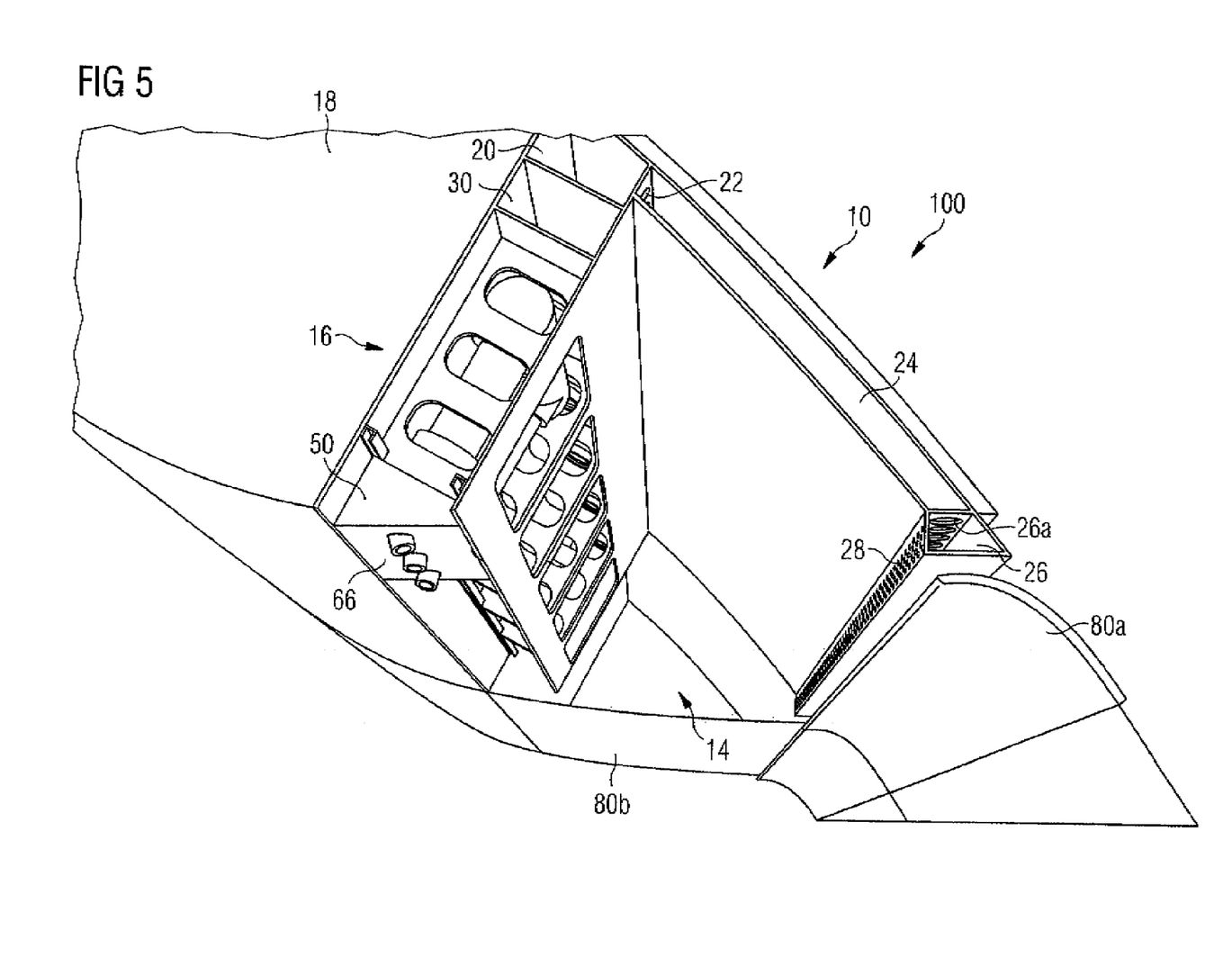
FIGS. 5 and 6 a possible installation situation for the inventive supply system in an interior passenger space.

FIG. 5 shows the supply system 100 according to the invention in an installation situation with corresponding trim panel elements 80a, 80b of the interior passenger space. The second section 14 here is delimited by a trim element 80b which can open for example in the manner of a flap when it is activated by a power surge or a data signal in an emergency. Components of an emergency oxygen supply, for example oxygen masks connected to an oxygen supply, which are received in the second section 14 can then fall or be pulled out of the second section 14 and into the interior passenger space.

In addition to components of an emergency oxygen supply for the passengers, it is alternatively possible for further components to also be received in the second section 14 as long as the available installation space permits this.

As is furthermore clearly shown in FIG. 5, the active modules 50 and therefore also the passive modules 70, as shown in FIG. 4b, are dimensioned such that their connection face 66 ends flush with the interior trim of the passenger cabin. It goes without saying that an additional trim element can alternatively also be applied to the connection face 66 although it is more advantageous if the active modules 50, as well as the passive modules 70, do not have to be provided with a further additional trim since this can reduce the number of trim elements.

If the passive modules 70 have no additional functions, they serve by means of their connection face 76 as a trim element for the unused receiving means 32, whereby they simultaneously fulfil a sealing function by closing the connecting opening 34 in sealing manner by means of their connecting section 72.

Figure 6:
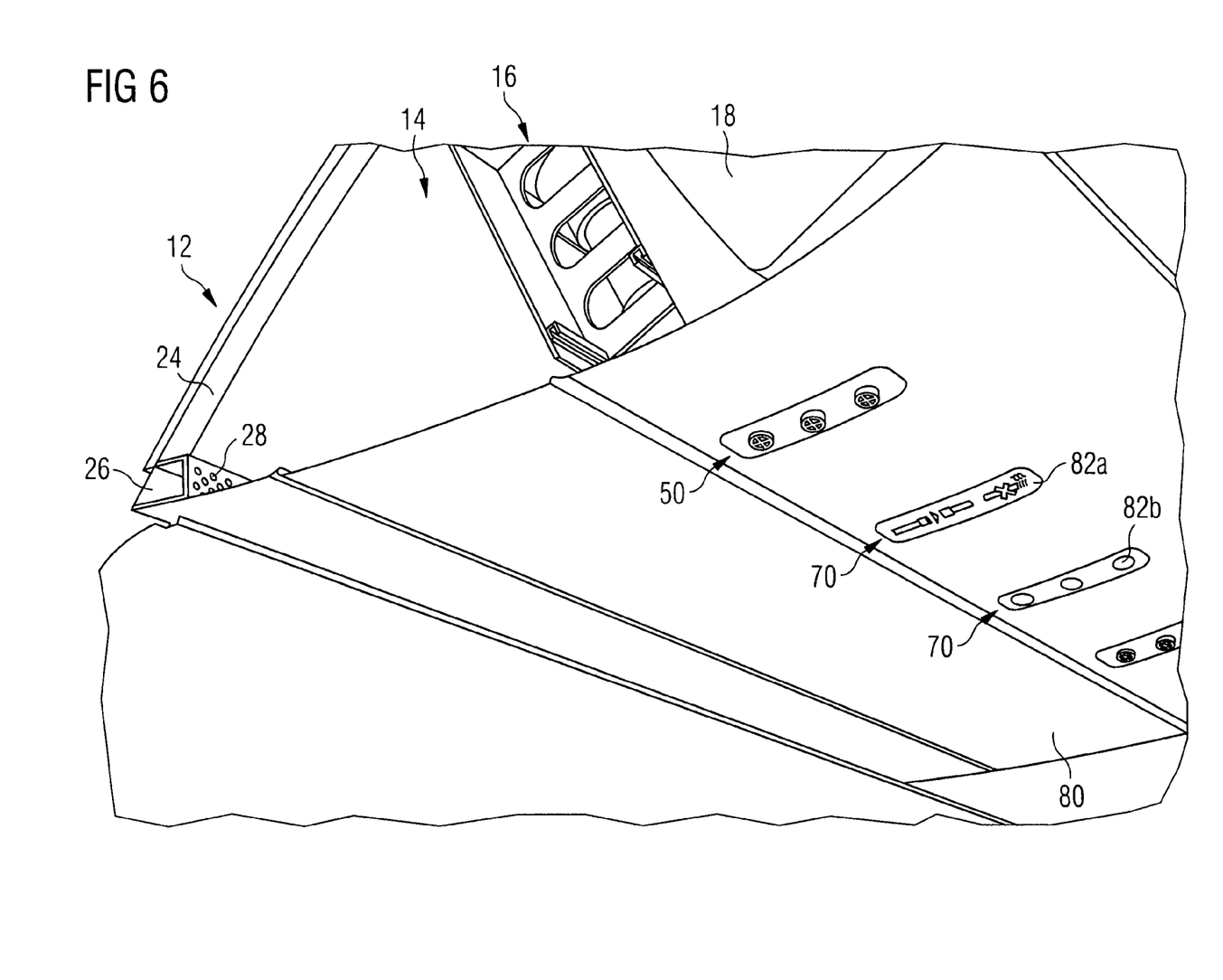

However, as shown in FIG. 6, the passive modules can also have operating and comfort elements such as the information displays 82a or reading lights 82b shown, as well as flight attendant call buttons, speakers and the like (passive module with additional function) which are not shown. In this case, the passive modules 70 have additional elements in the region of their connecting section 72 which enable a connection to power and/or data conduits 90 which can be directed into the supply conduit 30 for this purpose. With the aid of the passive modules 70, it is furthermore also possible for the air quantity control devices 56a of the active elements 50 to be supplied with power and controlled in that corresponding connections are provided between the passive and active module.

If a passive module 70 likewise has a connection piece for connection to the connecting opening 34 through which air can flow into the passive module, it is moreover also possible to use this as a cooling element for the surrounding active module and thus save on separate cooling elements.

FIG. 6 also shows that the individual air nozzles 58 can be arranged not only behind one another in the longitudinal direction of the passenger cabin, as shown in FIG. 5, but also next to one another as can be advantageous for a corresponding seat occupancy.

Owing to its special geometry, the support structure according to the invention provides both a section for components of the centrally controlled cabin ventilation system and a section for components of the individually adjustable cabin ventilation system. A further section, which provides installation space for components of an emergency oxygen supply for the passengers and possibly also other components, furthermore extends between the two sections. The support structure has a plurality of defined receiving devices for active modules for individually adjustable cabin ventilation. These receiving devices enable the modules to be inserted at defined spacings from one another without incurring the problems known from the prior art which relate to precisely monitoring the position and the clearances. Furthermore, as a result of releasably securing the active modules in receiving devices of the support structure, it is also possible to easily reconfigure the individually adjustable cabin ventilation system and therefore the cabin layout.

By providing a special sensor system, it is moreover possible to oversee the monitoring of the respective configuration of the active modules and the components of the emergency oxygen supply.

It is furthermore possible for at least one sensor 92 to be associated with each receiving device 32, said sensor being designed to determine whether the receiving device is equipped with an active module 50. The sensor 92 of this type may be designed for example as a pressure-sensitive sensor which is arranged in the receiving device 32 (FIG. 1) and may be activated by an active module 50 within the receiving device. However, other sensor types which serve to determine whether an active module is inserted in the receiving device are likewise conceivable. It is possible to determine with the aid of sensors 92 whether a receiving device 32 is equipped with a module or is free, and also whether the inserted module is an active module 50 or a passive module 70. It is in turn possible for example to use pressure sensors for this, wherein a recess or a projection optionally serve for differentiating between an active module 50 and a passive module 70 so that a pressure sensor is for example activated by only one type of module.

If the spacings between the seating rows are increased, passive modules which at least enable the receiving devices which are not occupied by an active module to be covered in air-tight manner can also be inserted into the support structure in addition to the active modules provided. However, the passive modules can moreover assume further additional functions, for example they can act as cooling elements or provide additional operating and comfort elements for the passengers.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A support structure for use in an air supply arrangement for air conditioning passenger cabins in aircraft, wherein the air supply arrangement comprises at least one centrally controlled cabin ventilation system and an individually adjustable cabin ventilation system, and wherein the support structure comprises:

a first section extending along a longitudinal length of the aircraft and arranged to receive and/or integrate components of the centrally controlled cabin ventilation system and configured to provide a continuous supply of fresh air to the passenger cabin, a second section separate from the first section extending along the longitudinal length of the aircraft, located adjacent to the first section in a width direction of the aircraft cabin, when used therein, perpendicular to the longitudinal length of the aircraft and arranged to receive or integrate components of an emergency oxygen supply for the passengers, and a third section separate from the first and second sections extending along the longitudinal length of the aircraft, located adjacent to the first and second sections in the width direction of the aircraft cabin perpendicular to the longitudinal length of the aircraft, comprising a plurality of receiving devices, wherein each receiving device is designed to receive and releasably secure an active module for individually adjustable cabin ventilation, and wherein the third section has at least the number of receiving devices required for at least one receiving device to be associated with each seating row for maximum occupancy of the passenger cabin with a maximum number of seating rows arranged at a predetermined minimum spacing.

2. A support structure according to claim 1, wherein the first section comprises an air conduit and an outlet for the cabin ventilation system, which are designed such that they are integrated in the support structure.

3. A support structure according to claim 1, wherein the third section comprises a supply conduit which is connected by at least one connecting opening to each of the plurality of receiving devices of the third section, wherein in particular each receiving device of the third section is of a cylindrical construction and is delimited by a generated cylinder surface and an end face, and wherein in particular the at least one connecting opening is constructed at the end face of the cylindrical receiving device.

4. A support structure according to claim 1, wherein the supply conduit comprises an air conduit and at least one power and/or data conduit.

5. A support structure according to claim 1, wherein at least one sensor is associated with each receiving device, said sensor being designed to establish whether the receiving device is equipped with an active module.

6. A supply system supplying passengers in a passenger space, comprising at least one support structure according to claim 1 and at least one active module for individually adjustable cabin ventilation.

7. A supply system according to claim 6, which comprises at least one further, passive module, wherein the passive module is designed to be received in at least one of the receiving devices of the third section of the support structure in which no active module is received.

8. A supply system according to claim 7, wherein the active module comprises at least one connection piece corresponding to the connecting opening of the third section and at least one air nozzle connected to said connection piece, wherein the active module in particular comprises at least one air quantity control device which is associated with the at least one air nozzle, and wherein in particular the air quantity control device is electrically controllable.

9. A supply system according to claim 7, wherein the passive module comprises a connecting section corresponding to a connecting opening of the supply conduit of the third section and wherein the passive module in particular may comprise operating or comfort elements which are connectable by the connecting opening to a data and/or power conduit of the supply conduit.

10. A method for configuring a supply system according to claim 6 in a passenger cabin of an aircraft, comprising the steps:
determining the configuration of active and passive modules within the support structure with reference to a predetermined occupancy of the passenger cabin with a number of seating rows arranged at a predetermined spacing, wherein at least one active module is associated with each seating row; and
inserting active modules according to the determined equipment of the support structure.

11. A method according to claim 10, comprising the further step:
inserting passive modules into the receiving devices of the third section of the support structure in which an active module is not received.

12. A method according to claim 11, comprising the further step:
determining an equipment for each receiving device of the third section with the aid of sensors, wherein these sensors determine whether a receiving device is equipped with an active module.

13. A method according to claim 12, comprising the further steps:
comparing the determined equipment of the support structure with a predetermined equipment; and
transmitting feedback relating to whether the determined equipment of the support structure corresponds to or deviates from the predetermined equipment.

* * * * *